United States Patent
Kuo

(10) Patent No.: US 6,459,624 B1
(45) Date of Patent: Oct. 1, 2002

(54) MEMORY STRUCTURE CAPABLE OF PREVENTING DATA LOSS THEREIN AND METHOD FOR PROTECTING THE SAME

(75) Inventor: Yao-Jung Kuo, Hsinchu (TW)

(73) Assignee: Megawin Technology Co., Ltd., Hsinchu (TW)

( * ) Notice: Subject to any disclaimer, the term of this patent is extended or adjusted under 35 U.S.C. 154(b) by 96 days.

(21) Appl. No.: 09/653,315

(22) Filed: Sep. 1, 2000

(51) Int. Cl.[7] .............................................. G11C 16/04
(52) U.S. Cl. ............................ 365/185.33; 365/230.03; 714/36; 714/42
(58) Field of Search ..................... 365/185.33, 189.01, 365/230.01, 200, 230.03; 714/42, 36

(56) References Cited

U.S. PATENT DOCUMENTS 5,649,090 A * 7/1997 Edwards et al. ....... 395/182.08
6,058,047 A * 5/2000 Kikuchi ................. 365/185.33

* cited by examiner

Primary Examiner—Son T. Dinh
(74) Attorney, Agent, or Firm—Rosenberg, Klein & Lee

(57) ABSTRACT

The present invention relates to a memory structure and, more particularly, to a programmable memory structure erasable by electricity and a method for protecting the same. The present invention partitions a memory into a main memory section and a special memory section. A logical controller and an error detector are installed in the special memory section. When the system is booted, the special memory section will drive the error detector to detect whether the data in the main memory section is damaged. If data is lost, a backup data is read from a hard disk device via the logical controller to successfully complete booting procedures. On the other hand, this backup data will be directly duplicated into the main memory section to restore the damaged data. Thereby the data therein can be prevented from losing.

21 Claims, 3 Drawing Sheets

MEMORY STRUCTURE CAPABLE OF PREVENTING DATA LOSS THEREIN AND METHOD FOR PROTECTING THE SAME

FIELD OF THE INVENTION

The present invention relates to a memory structure and, more particularly, a programmable memory structure erasable by electricity and a method for protecting the same, which can prevent the system from not being able to boot so that it is not necessary to restore the system afterward.

BACKGROUND OF THE INVENTION

Programmable memories erasable by electricity, such as electrically erasable programmable memories (EEPROM's) or flash memories, have been widely used in communication products or portable computers recently because they can keep data therein without the need of electricity. Also, they have the advantages of high data-accessing speed, small power dissipation, shock resistance, and better rewritable characteristic.

Moreover, because of continual development of system products, associated system standards become more and more complex. For information equipment, if the. basic input/output system (BIOS) of the system can not be refreshed immediately, the system can not acquire the advantages of the new BIOS. Therefore, programmable memories erasable by electricity are widely used to store the BIOS data of the system. Although EEPROM's or flash memories have the above advantages, the correct BIOS data therein may be altered improperly or damaged because they can be easily changed by electricity. This is more the case especially in nowadays when there are rampant computer viruses and hackers, resulting in the situations of not being able to boot or use the system. Therefore, inconvenience of the user will arise, and expense for restoring the system afterward will be wasted.

SUMMARY AND OBJECTS OF THE PRESENT INVENTION

Accordingly, the primary object of the present invention is to provide a memory structure capable of preventing the data therein from losing and a method for protecting the same. In the proposed memory structure, the memory is partitioned into a main memory section for storing data and a special memory section for storing a program registering a path (called a path program). The path program in the special memory section will be fully protected and controlled. When the data in the main memory section is damaged, the system will be directed to a path having another backup data so that booting procedures can be completed. Thereby the situation of not being able to boot will not occur.

Another object of the present invention is to provide a memory structure capable of preventing the data therein from losing and a method for protecting the same. In the proposed memory structure, the backup data can be duplicated directly into the main memory section to prevent the data from losing.

Yet another object of the present invention is to provide a memory structure capable of preventing the data therein from losing and a method for protecting the same, wherein the instruction for changing the data in the main memory section will be strictly monitored to prevent the attack of computer hackers or viruses.

Still yet another object of the present invention is to provide a memory structure capable of preventing the data therein from losing and a method for protecting the same, wherein the data in the main memory section will not be improperly changed so that remedial demarches and expense for restoration afterward can be avoided.

To accomplish the above objects, the present invention partitions a programmable memory erasable by electricity into a main memory section for storing data such as the BIOS and a special memory section for storing a path program. The special memory section can be connected to the main memory section and an error detector. A logical controller is respectively connected to the special memory section and a central processing unit (CPU) to control the change of the data in the special memory section. When the system is booted, the program in the special memory section will drive the error detector to detect whether the data or programs in the main memory section are damaged. If yes, the logical controller will directly read the backup data from a hard disk device via the CPU and duplicate the backup data directly into the main memory section. Thereby booting procedures can be successfully completed, preventing the data from losing.

The present invention also provides a method for fabricating a memory cell structure of a flash memory. The proposed fabrication method comprises mainly the following steps.

(1) The memory is partitioned into a main memory section for storing data and a special memory section for storing a path program. The special memory section is respectively connected to a logical controller and an error detector;

(2) When the program in the special memory section receives a reading instruction, it will drive the error detector to detect whether the data in the main memory section is correct;

(3) If the data in the main memory section is not correct, the program in the special memory section will drive the logical controller to read a backup data from a hard disk device and duplicate the backup data into the main memory section. Thereby booting procedures can be successfully completed, preventing the data from losing;

(4) When the program in the special memory section receives an alteration instruction, it will drive the logic controller to determine whether the alteration instruction is correct. Only if the alteration instruction is correct will the program in the special memory section inform the special memory to let an altered data be directly duplicated into the main memory section. Thereby attack of computer hackers and viruses can be prevented.

The various objects and advantages of the present invention will be more readily understood from the following detailed description when read in conjunction with the appended drawings, in which:

DETAILED DESCRIPTION OF PREFERRED EMBODIMENT

Figure 1:
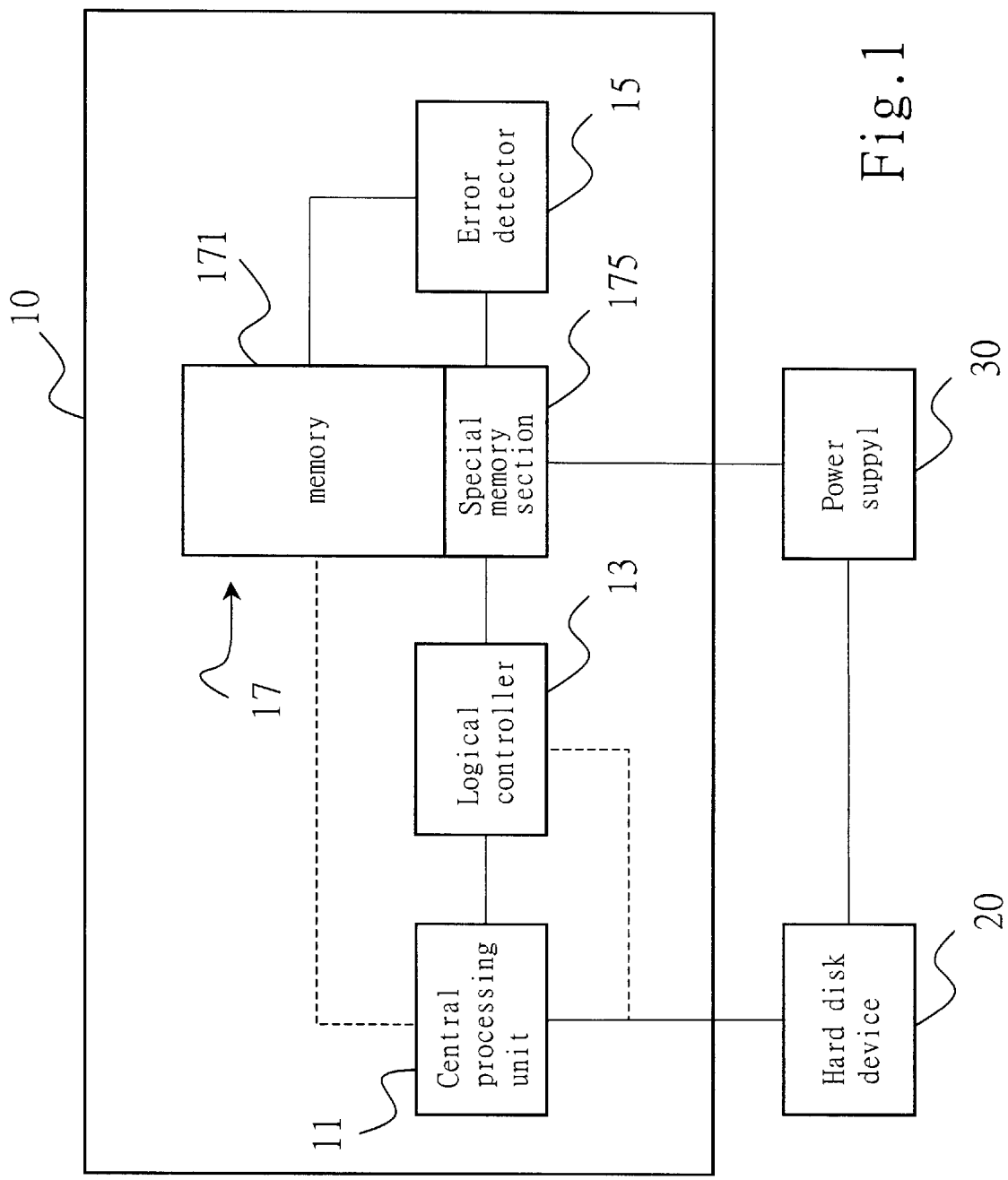
FIG. 1 is a block diagram according to a preferred embodiment of the present invention.

As shown in FIG. 1, the present invention partitions an EEPROM or a flash memory 17 installed on a motherboard 10 into a main memory section 171 for storing the BIOS data or programs and a special memory section 175 for storing a path program. The special memory section 175 can be connected to the main memory section 171, an error detector 15, and a logic controller 13. The logic controller 13 is further connected to a CPU 11.

Figure 2:
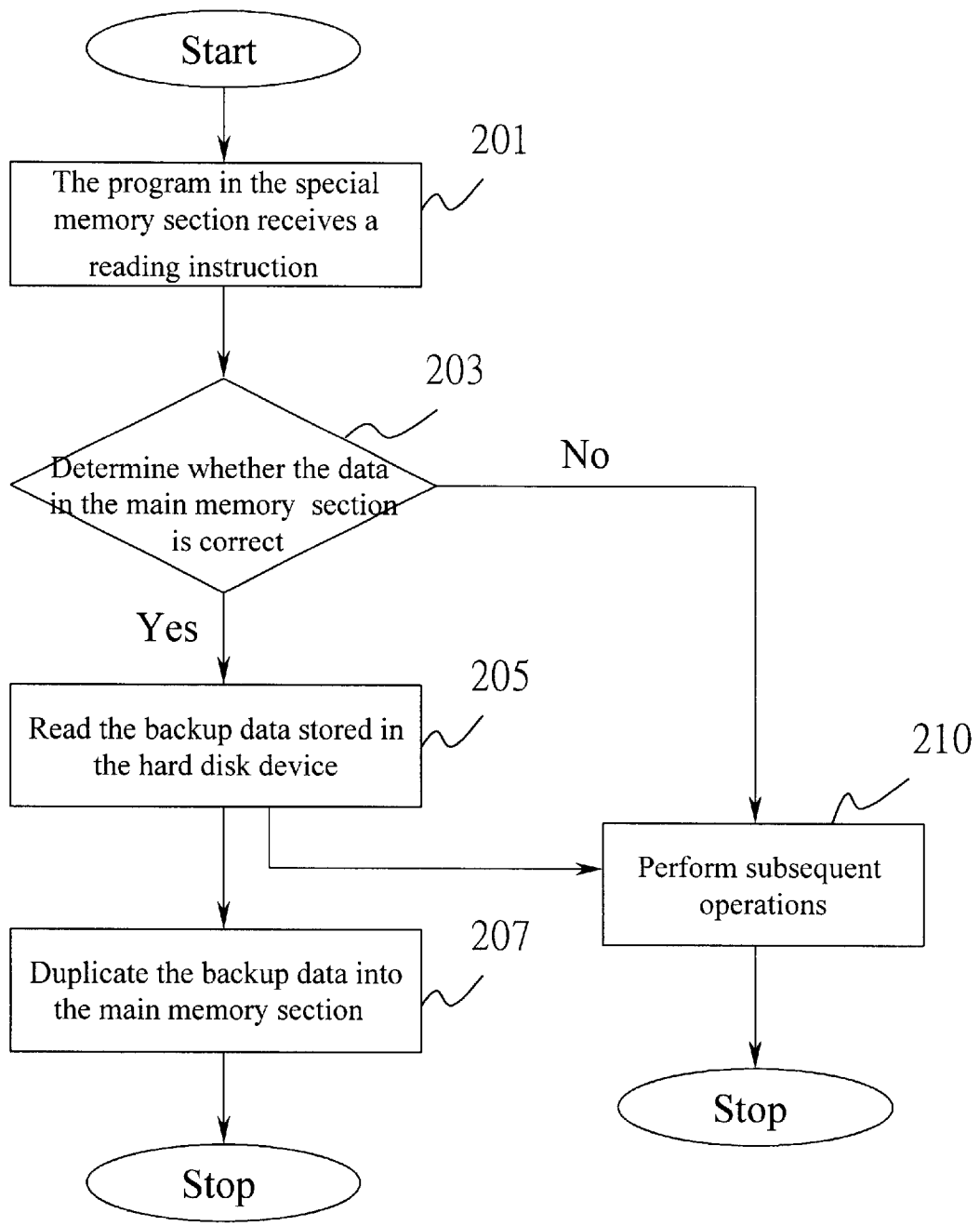
FIG. 2 is a flowchart showing the actions when the system is booted.

FIG. 2 shows the action flowchart of the present invention when a power supply 30 is turned on to provide electricity. With reference to FIG. 1, the present invention comprises mainly the following steps:

Step 201: When the special memory section 175 receives a reading instruction for reading the data in the main memory section 171, the program in the special memory section 175 will drive the error detector 15 to detect the BIOS data in the main memory section 171;

Step 203: The error detector 15 will determine whether the BIOS data in the main memory section 171 is damaged or wrong. If yes, step 205 is performed; if no, it means everything is all right, and step 210 is performed to continue normal operations of the BIOS such as performing subsequent operations of the CPU;

Step 205: Because the BIOS data in the main memory section is damaged, the path program in the special memory section 175 will drive the logic controller 13 to read a backup BIOS data from a hard disk device 20 directly (shown as the dashed line below the block of the logical controller 13) or through the CPU 11. Step 210 and step 207 are then performed, respectively. Performing step 210 is to let the system accomplish normal booting procedures without the need in prior art of turning off the machine and then booting the system with a system disk; and Step 207: The logical controller 13 duplicates the backup data in the hard disk device 20 into the main memory section 171 directly or through the CPU 11 (shown as the dashed line above the block of the CPU 11) to retrieve the damaged or lost data. This path will be closed when duplication is finished.

Figure 3:
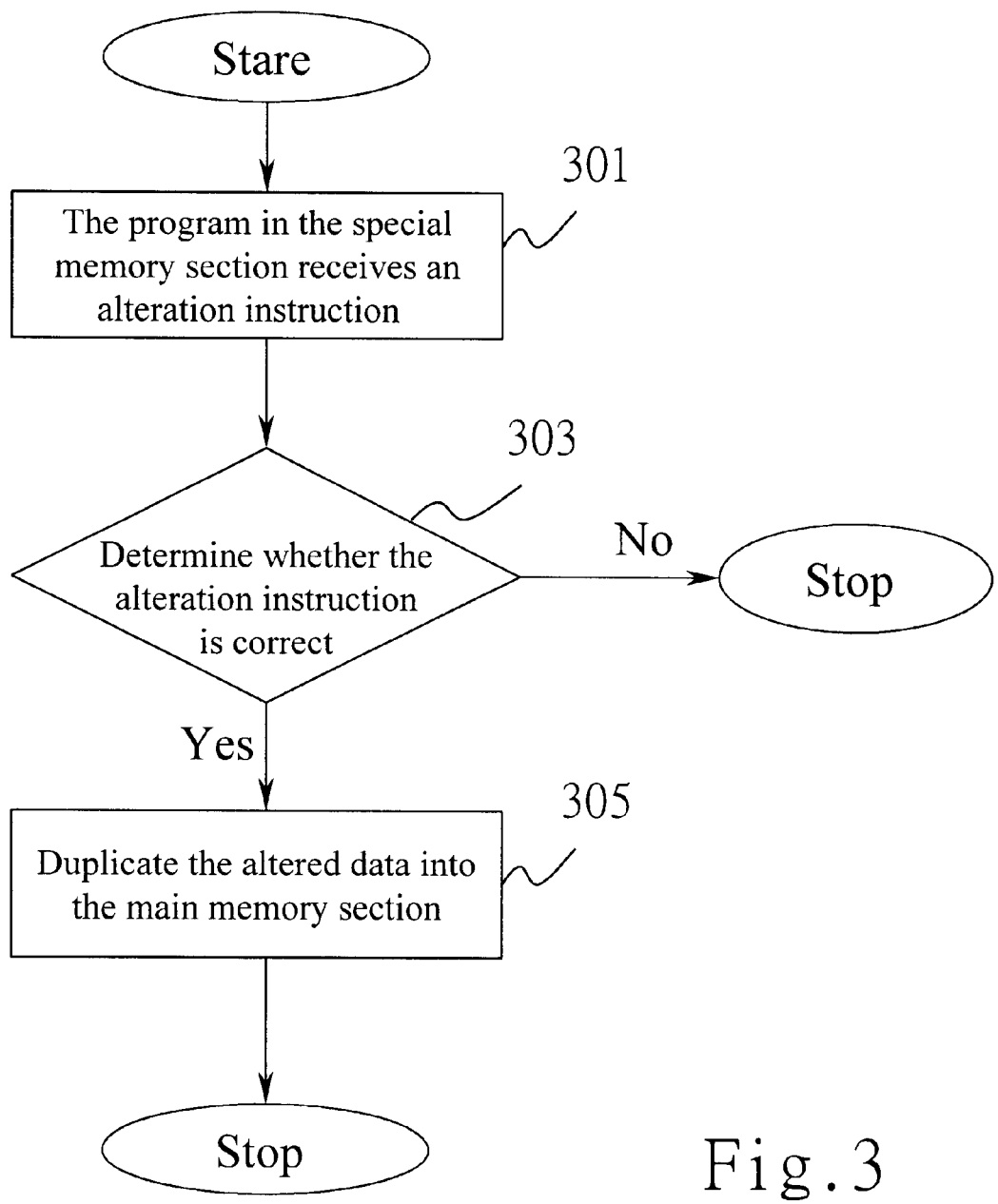
FIG. 3 is a flowchart showing the actions when the data in the main memory section is to be altered.

FIG. 3 shows the action flowchart when there are new peripheries to be added into the system so that the BIOS data in the main memory section 171 must be altered. With reference to FIG. 1, the present invention comprises mainly the following steps:

Step 301: The path program in the special memory section 175 receives an alteration instruction;

Step 303: The path program in the special memory section 175 will drive the logical controller 13 to judge whether the alteration instruction is the same as a preset instruction such as a control code or an object code. If yes, step 305 will be performed; if no, it means an improper alteration instruction is issued probably by computer hackers or viruses. This alteration instruction will be immediately terminated; and Step 305: A correct alteration instruction is issued. The logic controller 13 will inform the path program in the special memory section 175 to let the altered data be directly duplicated into the main memory section 171 through the CPU 11. Thereby the alteration action of the BIOS data is completed.

Of course, when the system is under normal operation, the logical controller will use the idle time of the CPU to detect whether the backup data in the hard disk device 20 is damaged or the same as the correct BIOS data in the main memory section 171. If they are not the same, the correct BIOS data in the main memory section 171 will be immediately duplicated into the hard disk device 20 to prevent computer viruses from damaging the backup data. The situation that the system does not know there are new hardware peripheries added can also be avoided.

As can be known from the above description, the path program in the special memory section 175 should be thoroughly protected. It is best not to change its content. Special processing is thus required. One method is to design different mask photolithography and etching procedures on a semiconductor substrate during the fabrication process to respectively form the main memory section 171 as an EEPROM or a flash memory and the special memory section as a programmable memory (PROM) or an erasable programmable memory (EPROM). Because both the PROM and EPROM are non-volatile memories that can not be easily changed by electricity, attack of computer hackers or viruses can be effectively prevented. Also, the object of changing data in the EEPROM and flash memory can be maintained.

In another method, the special memory section 175 is still an EEPROM or a flash memory, but has a tunneling oxide thicker than that of the main memory section 171. Therefore, a specific high voltage is required to perform an alteration action. This external high voltage can be applied only by the activation of the logic controller 13 through its charge pumping effect. The protection of the path program in the special memory section 175 can thus be achieved. The alteration of the data in the main memory section 171 should be done via the special memory section 175. Therefore, if the program in the special memory section 175 is not activated, the data in the main memory section 175 can not be altered.

Of course, the logical controller 13 and the error detector 15 can also be programs in the special memory section 175. Additionally, the main memory section 171 can also be of the same structure as that of the special memory section 175 protected by the logical controller 13.

Summing up, the present invention provides a memory structure capable of preventing the data therein from losing and a method for protecting the same. Thereby booting procedures can be successfully completed, and the data therein can be prevented from losing.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A memory structure capable of preventing data loss therein, comprising:
   a main memory section for storing data;
   a special memory section for storing a path program, said special memory section being connected to said main memory section and an error detector; and
   a logical controller respectively connected to said special memory section and a CPU to control a change of data in said special memory section;
   whereby when a computer is booted, said program in said special memory section will drive said error detector to detect whether data in said main memory section is damaged and if damaged said logical controller reads backup data from a hard disk device via said CPU and duplicate said backup data directly into said main memory section.

2. The memory structure of claim 1, wherein said memory can be an EEPROM or a flash memory.

3. The memory structure of claim 1, wherein said special memory section can be a PROM or an EPROM.

4. The memory structure of claim 1, wherein both said logic controller and said error detector can be programs in said special memory section.

5. The memory structure of claim 1, wherein said main memory section can also be connected to said logic controller to form another special memory section.

6. The memory structure of claim 1, wherein the tunneling oxide of a memory cell of said special memory section is thicker than that of said main memory section.

7. A memory structure capable of preventing data loss therein, comprising:

a main memory section for storing data;

a special memory section connected to said main memory section and having a program therein for controlling a change of data in said main memory section; and a logical controller connected to said special memory section;

whereby when data in said main memory section is to be altered, said logical controller will judge whether an alteration instruction is correct and if correct said logical controller will activate said program in said special memory section to alter the data in said main memory section.

8. The memory structure of claim 7, wherein said memory can be an EEPROM or a flash memory.

9. The memory structure of claim 7, wherein said special memory section can be a PROM or an EPROM.

10. The memory structure of claim 7, wherein said logic controller can be a program in said special memory section.

11. The memory structure of claim 7, wherein said main memory section can also be connected to said logic controller to form another special memory section.

12. The memory structure of claim 7 further comprises an error detector connected to said special memory section to detect whether the data in said main memory section is correct.

13. The memory structure of claim 12, wherein said error detector is a program in said special memory section.

14. The memory structure of claim 12, wherein there is a path program in said special memory section to read a backup data from a hard disk device and duplicate said backup data into said main memory section when the data in said main memory section is damaged.

15. The memory structure of claim 8, wherein the tunneling oxide of a memory cell of said special memory section is thicker than that of said main memory section, and said logical controller can control the voltage applied on said special memory section.

16. The memory structure of claim 7, wherein whether said logical controller will activate said program in said special memory section is determined by whether a control code of the input is correct.

17. A protection method for a memory capable of preventing data loss therein, comprising the steps of:

(1) partitioning said memory into a main memory section for storing data and a special memory section for storing a path program, said special memory section being respectively connected to a logical controller and an error detector;

(2) driving said error detector to detect whether data in said main memory section is correct when said program in said special memory section receives a reading instruction; and (3) driving said logical controller by said program in said special memory section to read backup data from a hard disk device and duplicate said backup data into said main memory section if data in said main memory section is not correct.

18. The protection method of claim 17 further comprises the step of: driving said logical controller to judge whether an alteration instruction is correct when said program in said special memory section receives said alteration instruction, and duplicating altered data into said main memory section if said alteration instruction is correct.

19. The protection method of claim 18, wherein whether said alteration instruction is correct is determined by whether it is the same as a preset control code.

20. The protection method of claim 17, wherein both said logical controller and said error detector are programs in said special memory section.

21. The protection method of claim 17, wherein said main memory section can be an EEPROM or a flash memory, while said special memory section can be a PROM or an EPROM.

* * * * *